(12) United States Patent
Hollingsworth

(10) Patent No.: US 8,225,897 B1
(45) Date of Patent: Jul. 24, 2012

(54) TWO WHEEL DRIVE FOR A MOTORCYCLE

(76) Inventor: James W. Hollingsworth, Los Angeles, CA (US)

( * ) Notice: Subject to any disclaimer, the term of this patent is extended or adjusted under 35 U.S.C. 154(b) by 0 days.

(21) Appl. No.: 11/287,014

(22) Filed: Nov. 23, 2005

(51) Int. Cl.
*B62K 11/00* (2006.01)
(52) U.S. Cl. ................... 180/224; 180/223; 180/219
(58) Field of Classification Search ............ 180/223, 180/224, 219, 255
See application file for complete search history.

(56) References Cited

U.S. PATENT DOCUMENTS

| | | | | |
|---|---|---|---|---|
| 2,825,417 | A * | 3/1958 | Uher | 180/227 |
| 3,001,599 | A * | 9/1961 | Fryar | 180/208 |
| 3,045,772 | A * | 7/1962 | Nicolai | 180/224 |
| 3,199,623 | A * | 8/1965 | Mangum | 180/224 |
| 3,268,025 | A * | 8/1966 | Fehn | 180/224 |
| 4,702,340 | A * | 10/1987 | Hamilton | 180/224 |
| 4,770,434 | A * | 9/1988 | Pietro | 280/278 |
| 5,014,808 | A * | 5/1991 | Savard et al. | 180/219 |
| 5,042,608 | A | 8/1991 | Horiike et al. | |
| 5,050,699 | A * | 9/1991 | Savard | 180/219 |
| 5,054,572 | A * | 10/1991 | Parker | 180/224 |
| 5,113,964 | A * | 5/1992 | Yamauchi | 180/224 |
| 5,407,385 | A | 4/1995 | Duphily | |
| 5,503,244 | A * | 4/1996 | Beirlein | 180/219 |
| 6,505,699 | B1 * | 1/2003 | Christini et al. | 180/224 |
| 7,204,337 | B2 * | 4/2007 | Wildfellner | 180/292 |
| 2005/0077098 | A1 * | 4/2005 | Takayanagi et al. | 180/215 |

* cited by examiner

*Primary Examiner* — Anne Marie Boehler
*Assistant Examiner* — Maurice Williams
(74) *Attorney, Agent, or Firm* — Colin P. Abrahams

(57) ABSTRACT

A motorcycle where the rear wheel of the motorcycle is not only driven but the front wheel is also driven. Power from the motor of the motorcycle is transmitted to a power transmitting joint which includes an output shaft. The power transmitting joint is mounted directly below the steering stem and on the steering axis of the motorcycle. The power to the front wheel is supplied through a chain which connects between the steering assembly and the front wheel with the chain being movable in conjunction with the front wheel when the front wheel is steered and with suspension movement as when bumps are encountered.

7 Claims, 16 Drawing Sheets

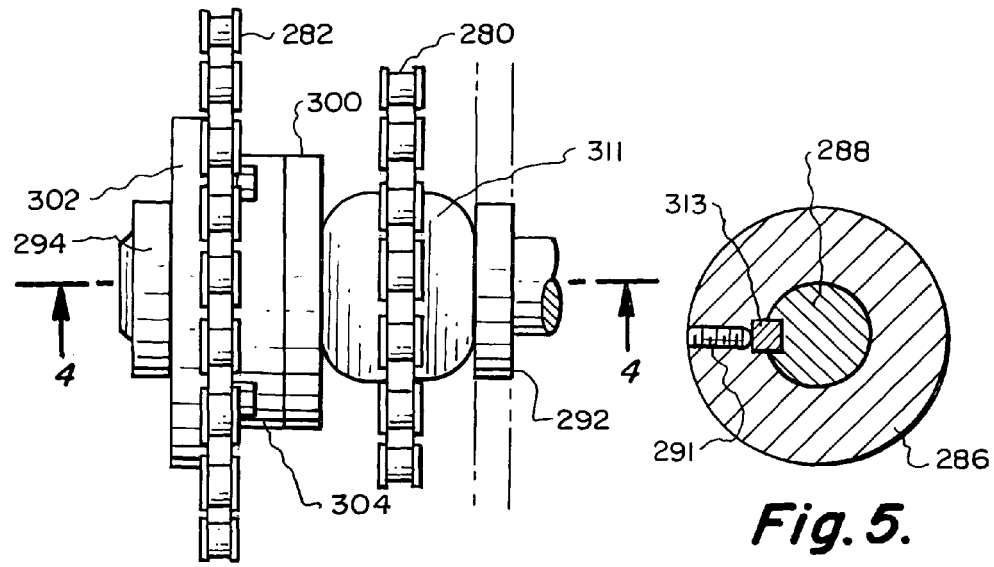
*Fig.3.*
*Fig.5.*
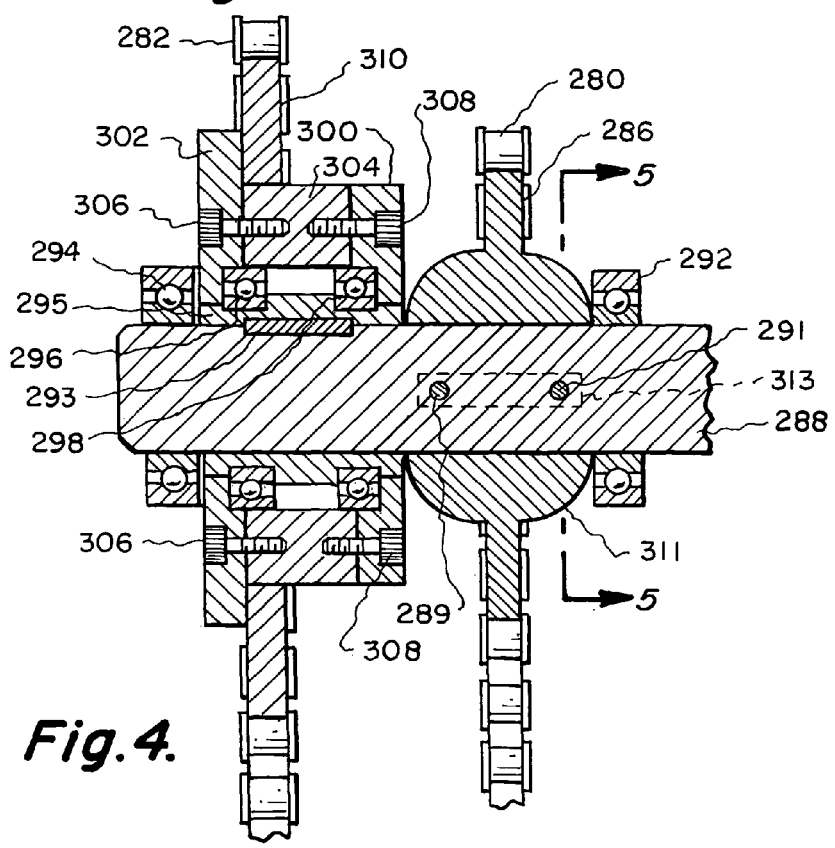
*Fig.4.*

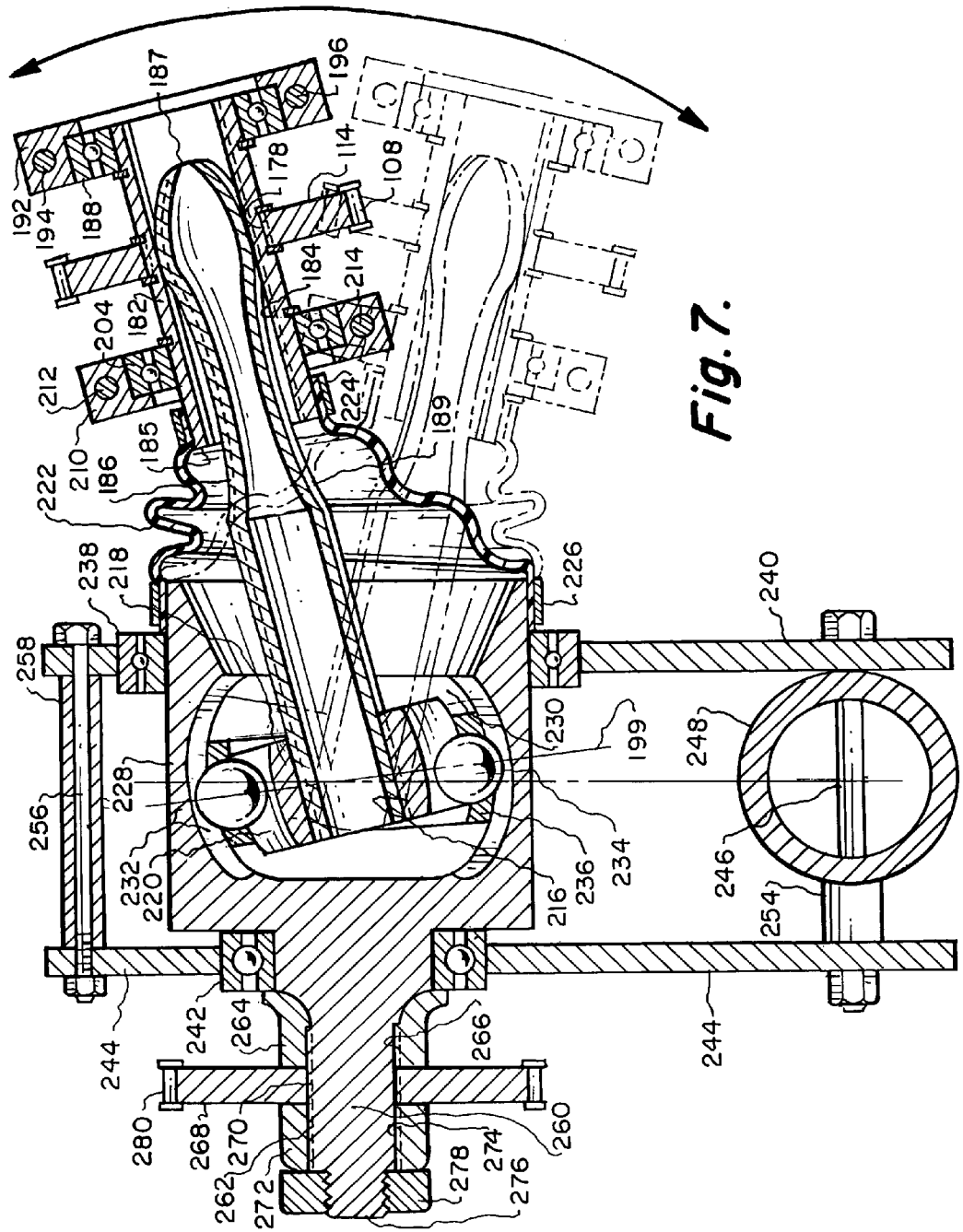

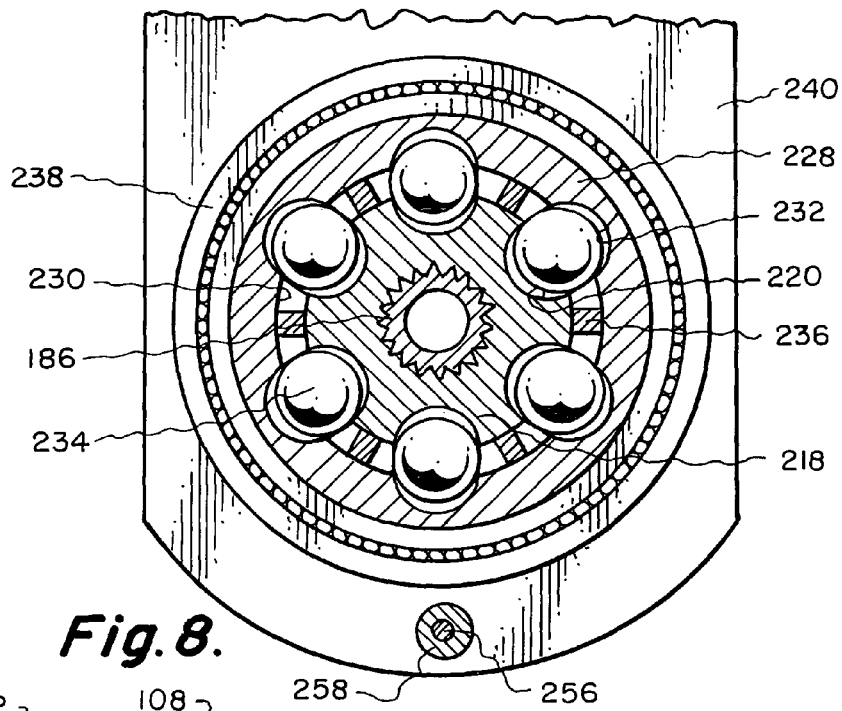
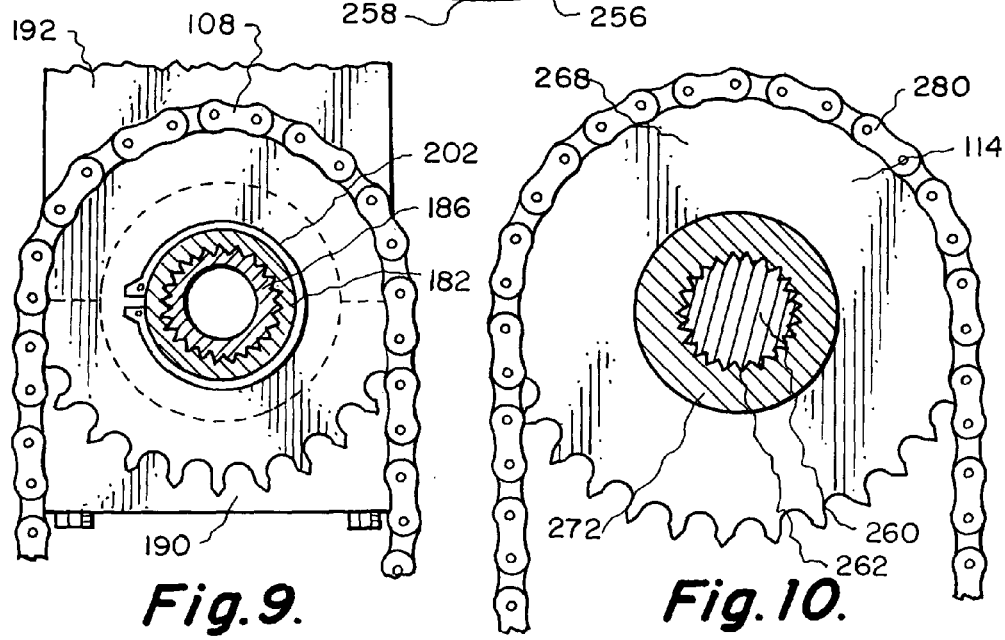

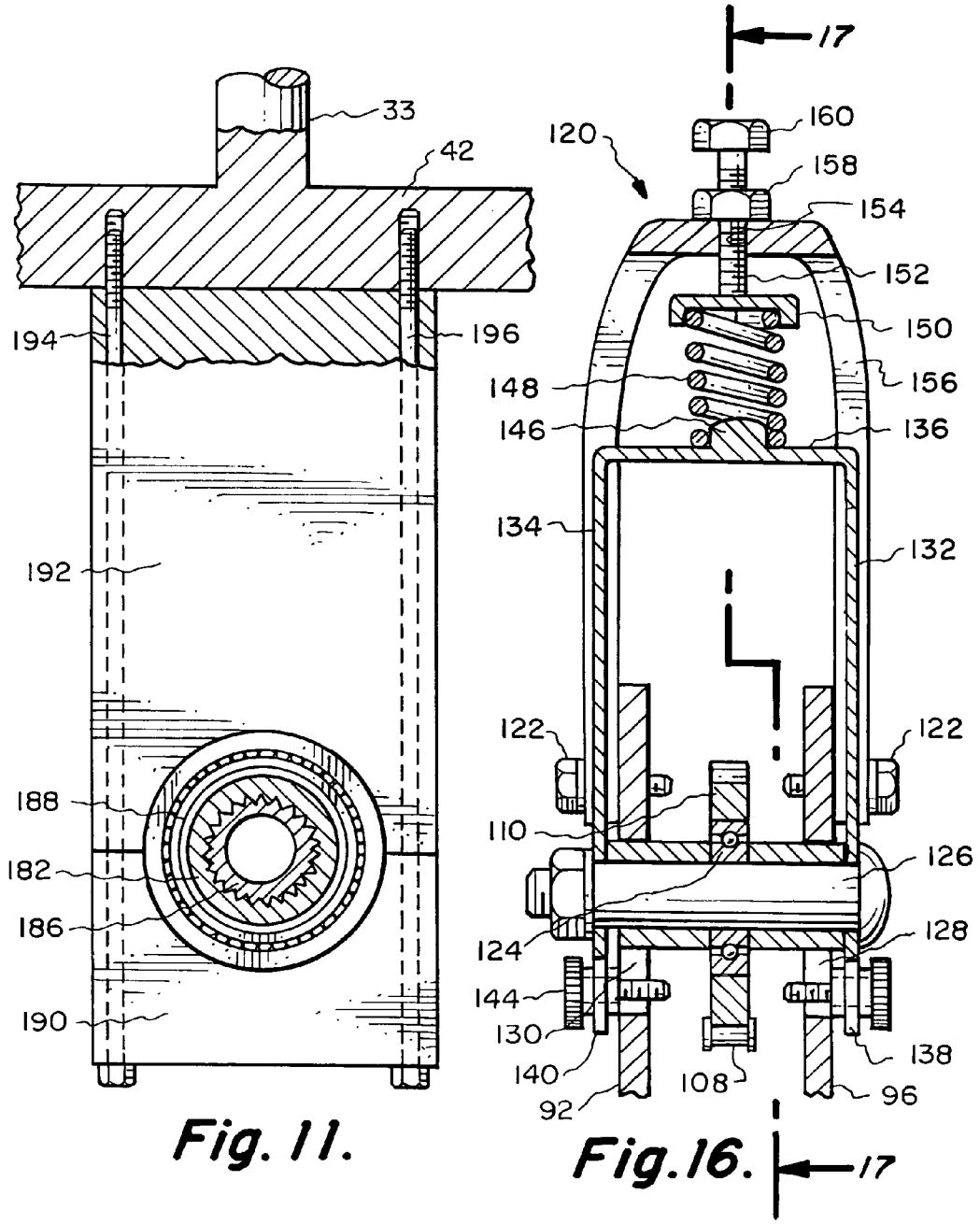

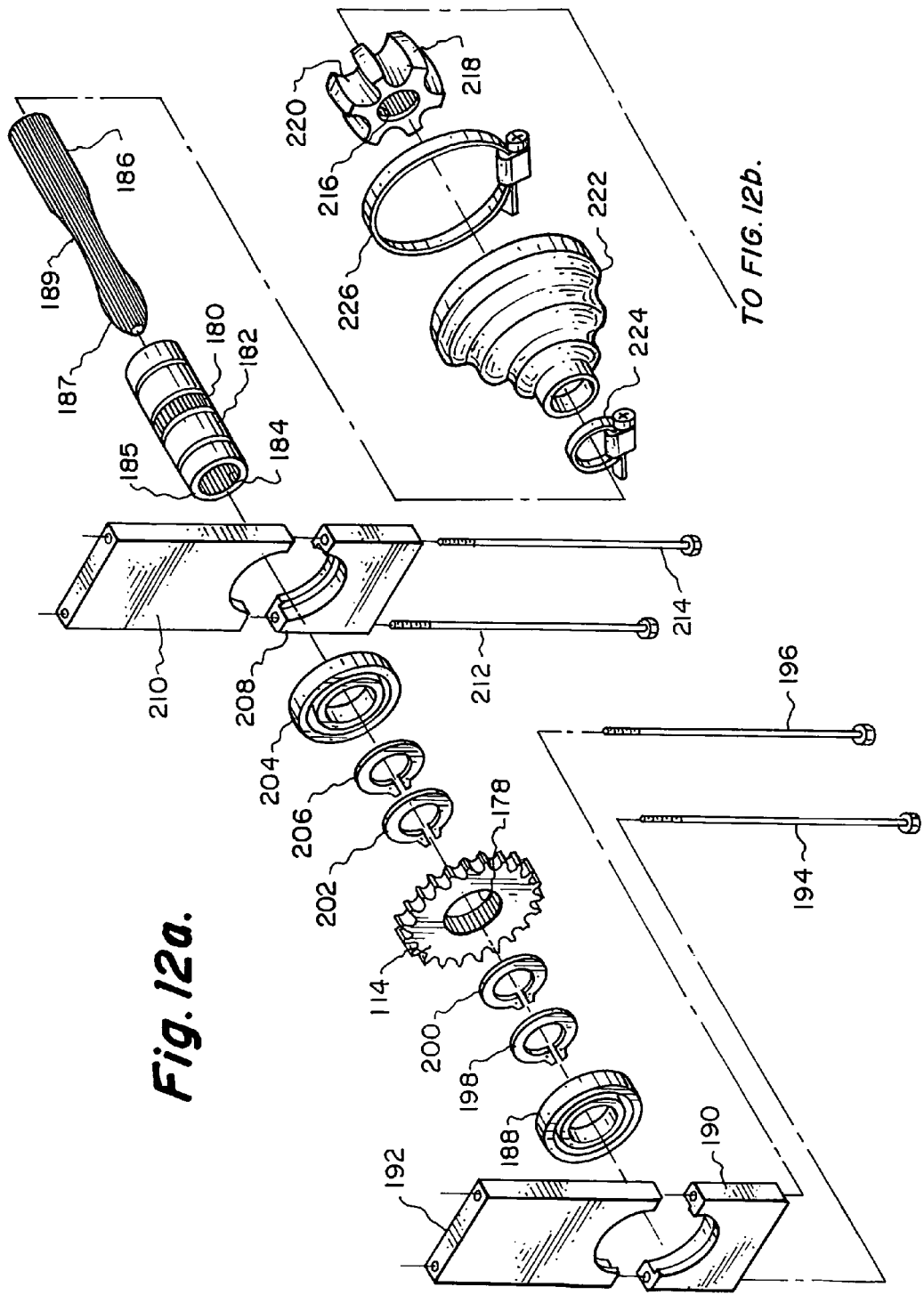

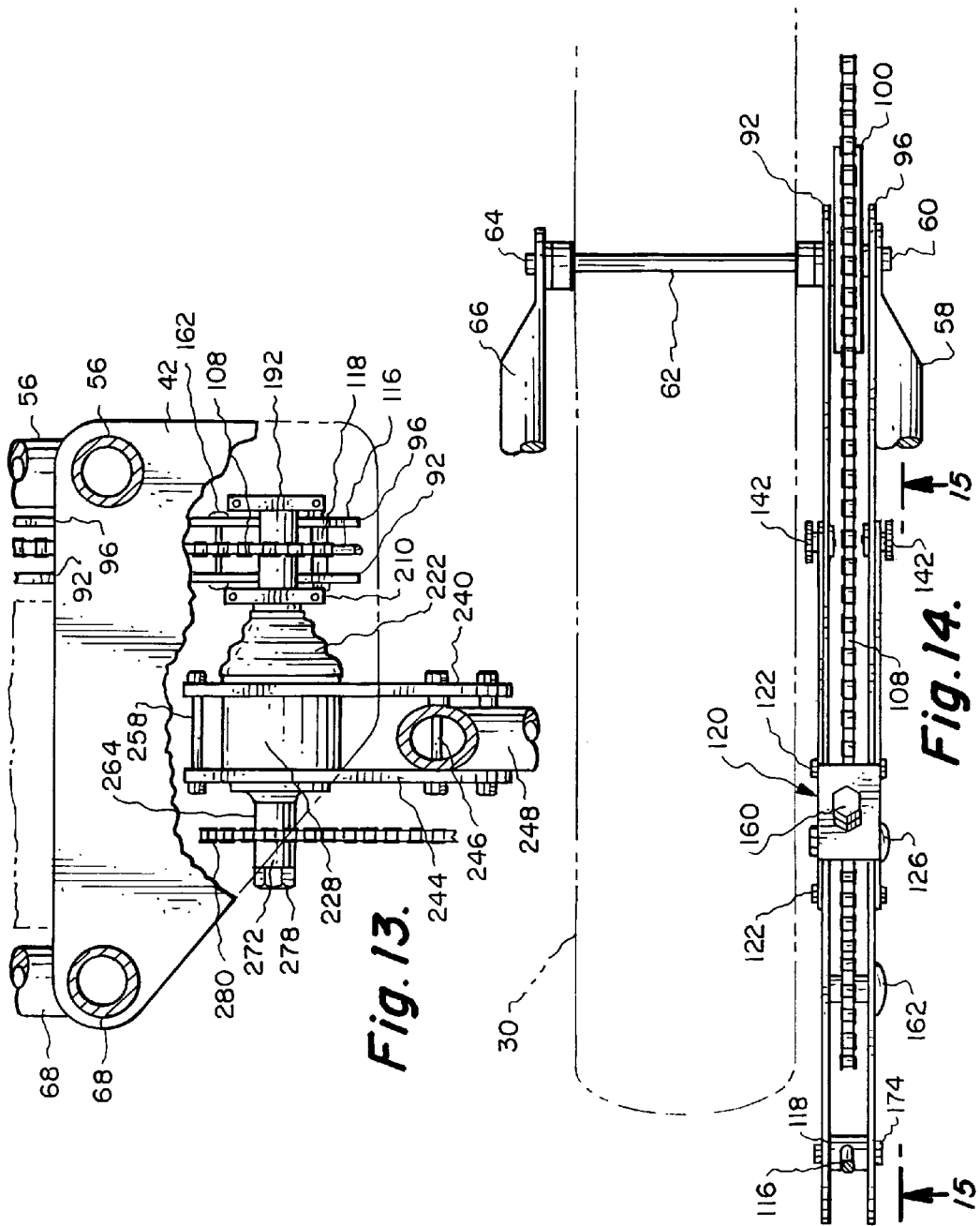

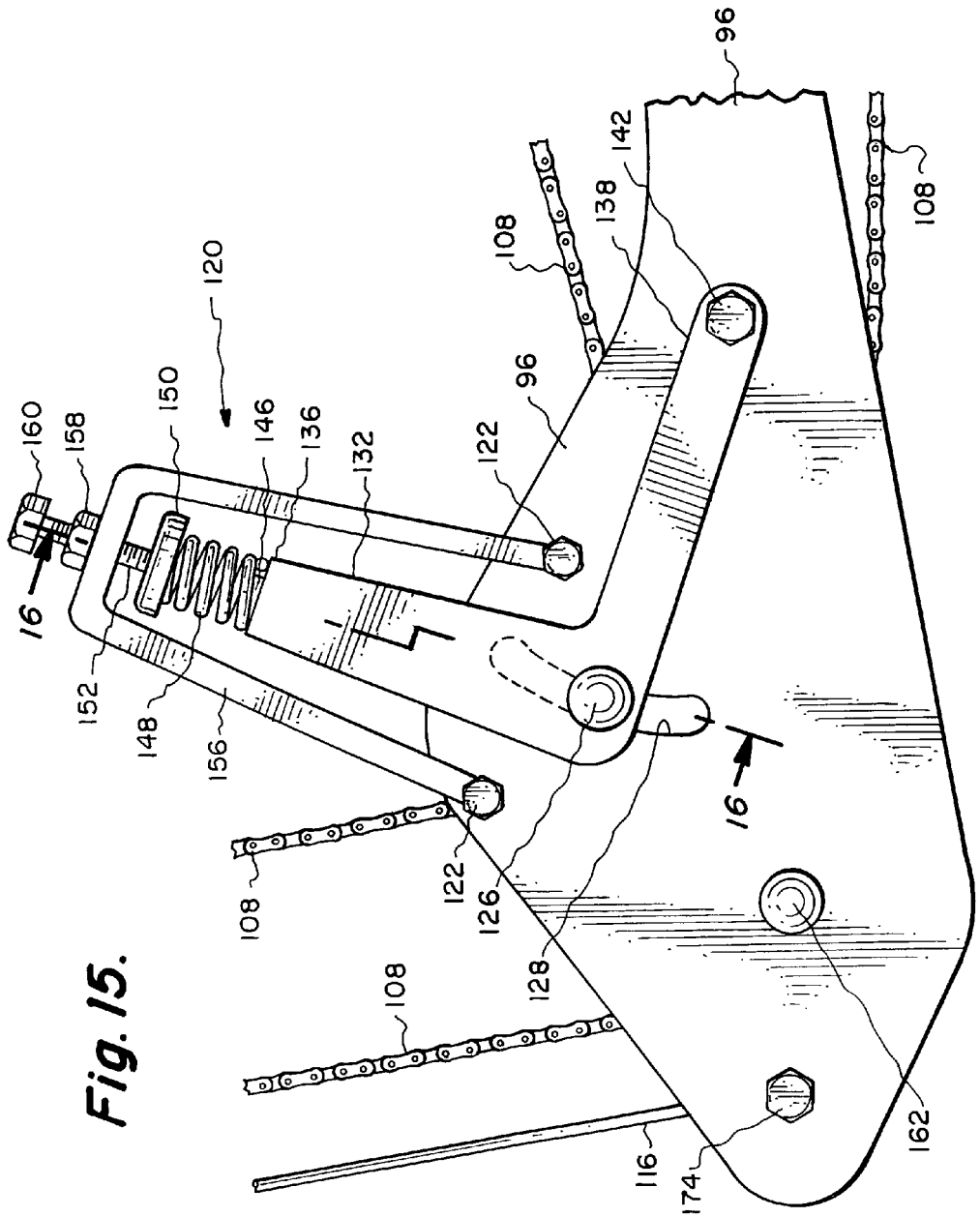

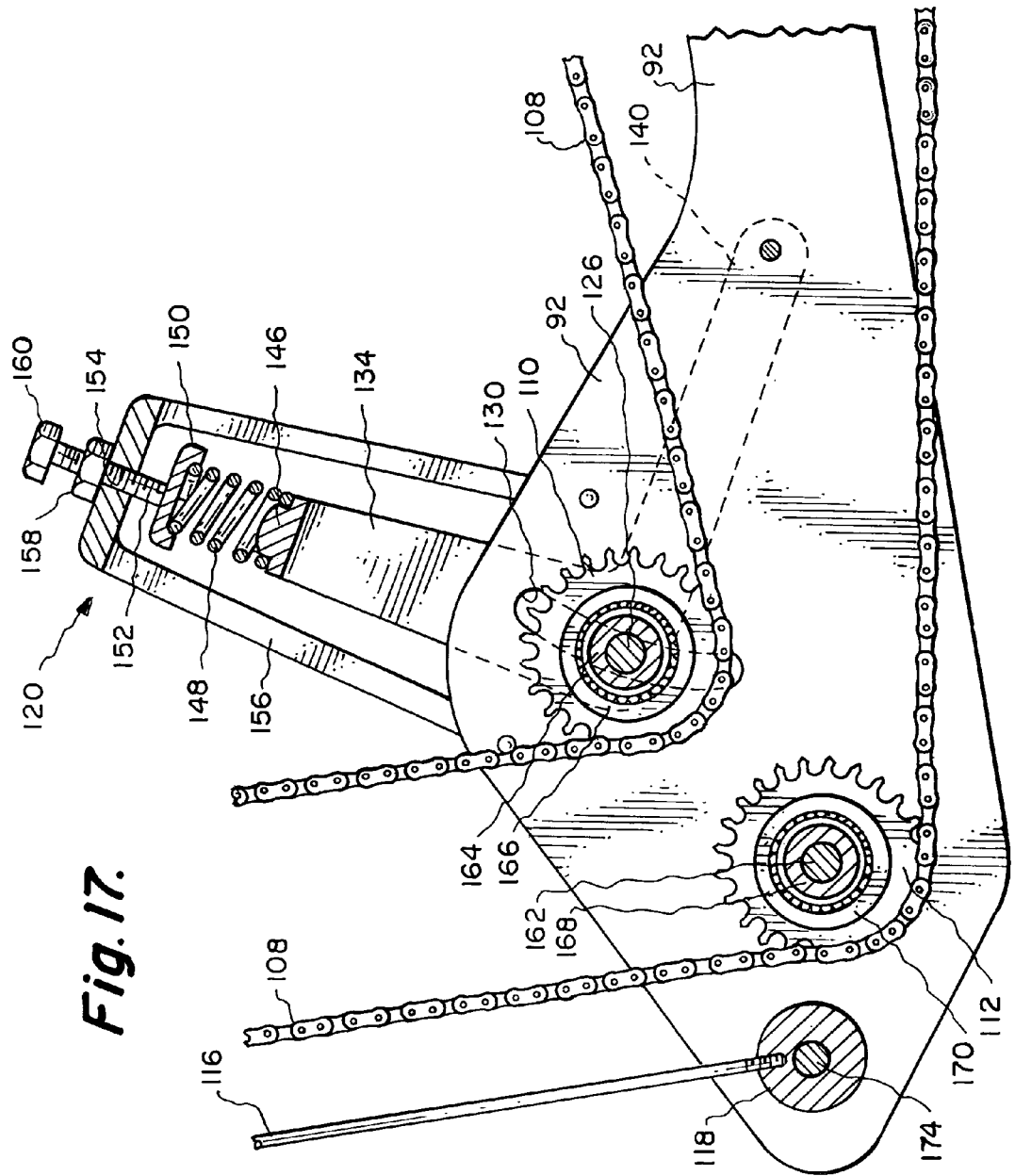

TWO WHEEL DRIVE FOR A MOTORCYCLE

BACKGROUND OF THE INVENTION

1. Field of the Invention

The field of this invention relates to steering mechanisms and more particularly to a driving mechanism that is designed to be used in conjunction with the front wheel of a motorcycle so that the front wheel of the motorcycle can be driven as well as the rear wheel of the motorcycle.

2. Description of the Related Art

Almost all motorcycles are driven by a motor that applies power solely to the rear wheel of the motorcycle. For certain usage, it would be desirable if power could be also applied to the front wheel of the motorcycle. If power is supplied to the front wheel as well as the rear wheel, it is readily apparent that the motorcycle would have double the traction. This increased traction would be most beneficial in relation to off road motorcycles and also motorcycles that are used to pull cargo. For example, in the past there has been manufactured a two-wheel-drive motorcycle known as the "trail breaker". The purpose of this motorcycle was to drag heavyweight objects out of narrow access environments, such as forests. Also, this type of motorcycle is advantageous for hilly terrain. However, the speed of operation of this particular motorcycle is limited to around ten miles per hour.

Other motorcycles with powered front wheels that have been constructed have one major problem and that is torque of the engine is supplied in an unbalanced manner to the steering of the motorcycle. The result is the steering of the motorcycle has an inherent tendency to pull to the left or pull to the right. The more power applied the greater the pull. Therefore, the motorcycle has to be operated at low power levels in order for the operator to steer the motorcycle and keep the motorcycle going in the desired direction. The operator has to fight against the pull constantly in order to keep the front wheel steered in the direction that the operator wishes to proceed. This constant pulling movement is not only annoying, it is actually a hazard and a momentary loss in the counteracting force by the operator against the pull or change of traction can result in the motorcycle crashing.

There is a need to construct a motorcycle that has a front wheel drive but where the engine torque that is transmitted to the front wheel is balanced so that there is no undesirable effect produced on the steering of the motorcycle.

BRIEF DESCRIPTION OF THE INVENTION

This invention is a method of transferring power from the engine to the front wheel of a motorcycle without making steering more difficult. It is added onto an existing rear wheel drive setup. It uses a known constant velocity (C-V) joint in a new way and in a new location.

Automobile C-V joints are usually located inside the front wheels on the axle center line. In this invention, the C-V joint is located outside the wheel and is connected to the front wheel and engine by chains. Its location under the steering head on the steering axis ensures that forces are balanced and steering remains neutral even at high power levels. Between a pair of chains and before the C-V joint is a one-way clutch which allows the front wheel to continue turning if the engine stops. This maintains steering control so the rider can safely bring the motorcycle to a stop.

A third chain from the C-V joint down to the front wheel goes around two idler sprockets, one of which is spring loaded. This compensates for the chain becoming tighter as the wheel moves up in its suspension. The spring tension can be weak because the one-way clutch prevents chain loading on the return side. The idler wheels are mounted on two chain plates which are located by ball bearings at the front and a torque rod at the rear. One ball bearing goes between the inner chain plate and wheel hub. The other ball bearing goes between the outer chain plate and axle. Another embodiment allows for the use of a double wheel bearing in the place of two single bearings. A thicker single support plate is used rather than two.

A torque rod mounts to the steering plate at the top and between the chain plates at the bottom. Thus, when engine power is applied to the chain, there is no tendency for the plates to bend or twist. The torque rod controls chain tension and prevents the chain plates moving up when power is applied.

SUMMARY OF THE INVENTION

The first basic embodiment of the present invention is in conjunction with a motorcycle which has a front wheel and a rear wheel mounted on a frame. The frame includes a steering stem which has a longitudinal center axis known as the steering axis. A steering bearing assembly is pivotally mounted on the steering stem with pivoting occurring about the longitudinal center axis. A handlebar assembly is provided for turning of the front wheel through a horizontal steering angle which will steer the motorcycle to a leftward direction and to a rightward direction. A fork assembly is connected by steering plates between the steering stem and the front wheel. The improvement is directed to the including of a power transmitting joint mounted on the frame with the power transmitting joint to receive power from the motorcycle motor. The power transmitting joint has an output shaft with this output shaft being connected to the lower steering plate. The power transmitting joint has a joint housing having an internal chamber that is connected to the output shaft where an annular series of balls are located within the internal chamber and drivingly connected to the joint housing. The balls connect with the output shaft and the joint housing is to be rotated by power from the motor. The power transmitting joint is mounted directly below the steering stem and on the steering axis so not only will power be transmitted from the motor to the rear wheel but also to the front wheel. There is a chain connected between the front wheel and the power transmitting joint to cause driving rotation of the front wheel.

A further embodiment of the present invention is where the first basic embodiment is modified by defining that the frame has a frame plane with the balls that are in driving connection within the joint housing are in alignment with this frame plane.

A further embodiment of the present invention is where the first basic embodiment is modified by defining that when the longitudinal center axis of the output shaft is located perpendicular to the frame plane that the driving axis through the balls lies within the frame plane.

A further embodiment of the present invention is where the first basic embodiment is modified by defining that there is a torque rod mounted between the steering plate assembly and the front wheel with this torque rod to maintain proper chain tension at different power levels and suspension movement. The torque rod is located parallel to and in longitudinal alignment with to the chain.

A further embodiment of the present invention is where the just previous embodiment is modified by defining that the chain and the torque rod are within the same plane and when the front wheel is positioned to cause the motorcycle to move in a directly forward direction that the chain plane is parallel to the frame plane.

A further embodiment of the present invention is where the first basic embodiment is modified by defining that the internal chamber has a basically circular transverse cross-section defined by a wall surface, the internal chamber has six equally spaced grooves formed within this wall surface. The grooves are parallel and arcuate longitudinally. One ball is located in each groove. Whereby the output shaft is movable horizontally for steering and power is continuously transmitted through the power transmitting joint regardless of the position of the handlebar assembly.

A second basic embodiment of the present invention is directed to be in combination with a motorcycle which has a front wheel and a rear wheel mounted on a frame. The frame includes a steering stem which has a longitudinal center axis known as the steering axis. A handlebar assembly is mounted on an upper steering plate and a lower steering plate with the pivoting occurring on the steering stem about the longitudinal center axis. The handlebar assembly is for turning of the front wheel of the motorcycle through a horizontal steering angle which will steer the motorcycle to either a leftward direction, to a rightward direction or a straight direction. A fork assembly connects the steering plates and the front wheel. The improvement is directed to a power transmitting joint mounted on the frame with this power transmitting joint to transmit power from the motorcycle motor to the front wheel of the motorcycle. The power transmitting joint has an output shaft with this output shaft attached to the lower steering plate. The handlebar assembly being movable horizontally through a sufficient angle to effect steering of the motorcycle. The power transmitting joint is located directly below the steering stem centered on the steering axis.

A further embodiment of the present invention is where the second basic embodiment is modified by defining that the power transmitting joint has a transverse center axis known as a driving axis. The driving axis coincides with the steering axis.

A further embodiment of the present invention is where the second basic embodiment is modified by defining that there is a continuous chain connected between the front wheel and the power transmitting joint to cause rotation of the front wheel.

A further embodiment of the present invention is where the just previous embodiment is modified by defining that there is a torque rod mounted between the steering plate assembly and the chain plates with this torque rod to control the chain tension when power is applied and during suspension movement. The torque rod is located behind and parallel to the chain.

A further embodiment of the present invention is where the just previous embodiment is modified by defining that the chain and the torque rod lie to one side of, and parallel to the steering plane. When the front wheel is positioned to cause the motorcycle to move in a directly forward direction the steering plane is parallel to the frame plane.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 3 is a top plan view of a portion of the chain drive taken along line 3-3 of FIG. 2;

FIG. 4 is a cross-sectional view of the present invention taken along line 4-4 of FIG. 3;

FIG. 5 is a cross-sectional view of the present invention taken along line 5-5 of FIG. 4;

FIG. 7 is a view similar to FIG. 6 but with the output shaft of the power transmitting joint of the present invention angularly displaced which would steer the motorcycle in a leftward direction with the steering of the motorcycle in a rightward direction being shown in dotted lines;

FIG. 8 is a cross-sectional view through the driving mechanism of the power transmitting joint taken along line 8-8 of FIG. 6;

FIG. 9 is a partly cross-sectional view showing more clearly the sprocket for the chain that connects to the front wheel taken along line 9-9 of FIG. 6;

FIG. 10 is a partly cross-sectional view of the sprocket that connects with the chain that extends to the motor taken along line 10-10 of FIG. 6;

FIG. 11 is a view partly in cross-section showing one of the mounting plates that is used to rotationally mount the output shaft of the power transmitting joint relative to the handlebar assembly taken along line 11-11 of FIG. 6;

FIG. 12A is an exploded isometric view of the structural components between the handlebar assembly and the driving star that is utilized in conjunction with the power transmitting joint which supports the driving balls within the power transmitting joint;

FIG. 13 is a cross-sectional view through the handlebar assembly showing the exterior of the power transmitting joint and its relationship relative to the input power chain from the motor and the output power chain to the front wheel of the motorcycle taken along line 13-13 of FIG. 1;

FIG. 14 is a cross-sectional view taken through the front wheel of the motorcycle showing the driving chain arrangement to the front wheel taken along line 14-14 of FIG. 1;

FIG. 15 is a side elevational view of the driving chain arrangement for the front wheel of the motorcycle taken along line 15-15 of FIG. 14;

FIG. 16 is a cross-sectional view taken through the chain tensioner mechanism that is utilized in conjunction with the driving chain from the front wheel of the motorcycle taken along line 16-16 of FIG. 15;

FIG. 17 is a cross-sectional view taken through the chain tensioner taken along line 17-17 of FIG. 16;

DETAILED DESCRIPTION OF THE INVENTION

Figure 1:
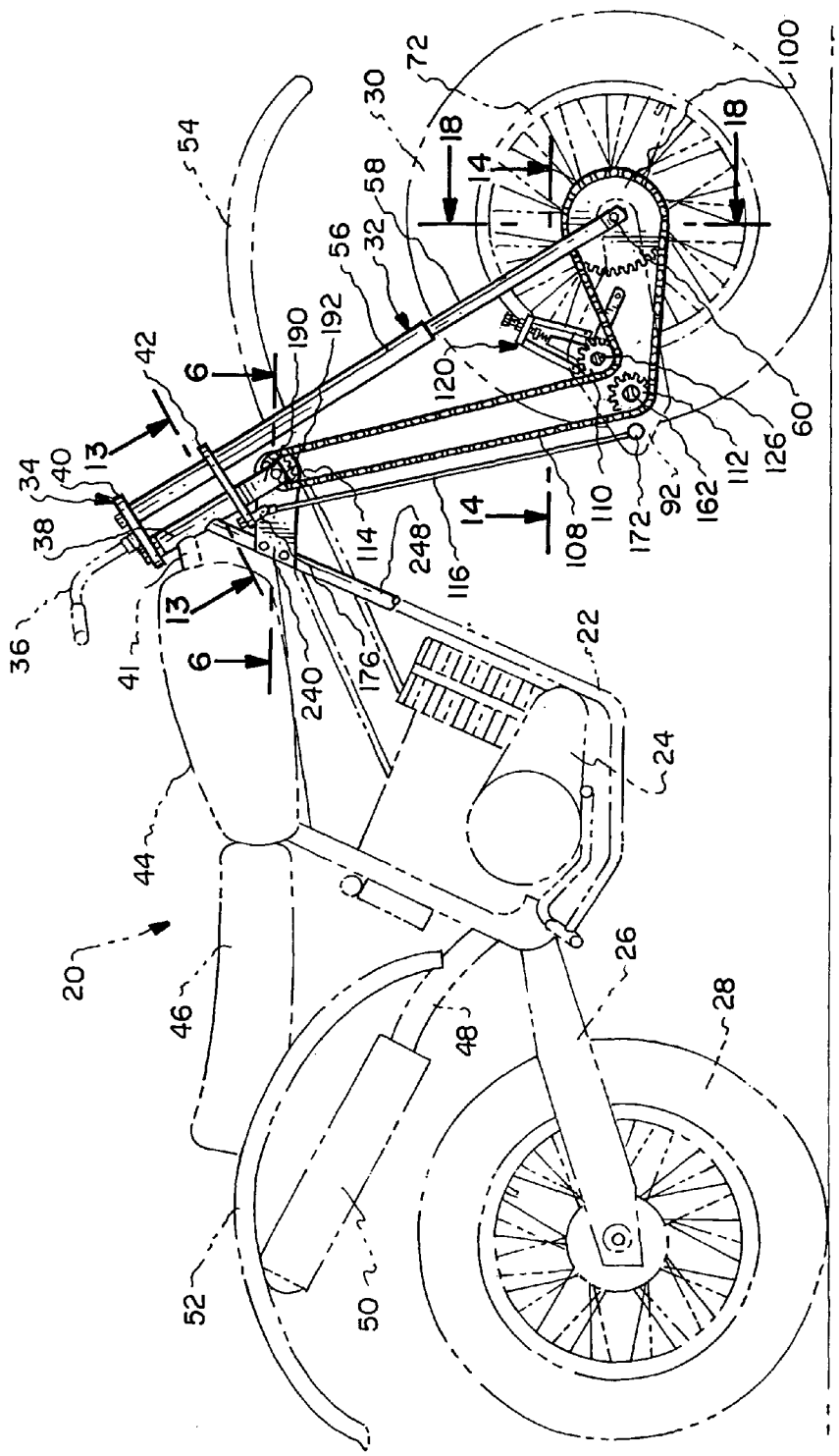
FIG. 1 is a right side elevational view of the mechanism that is used to drive a front wheel of a motorcycle with the front wheel of the motorcycle shown in phantom.
Figure 2:
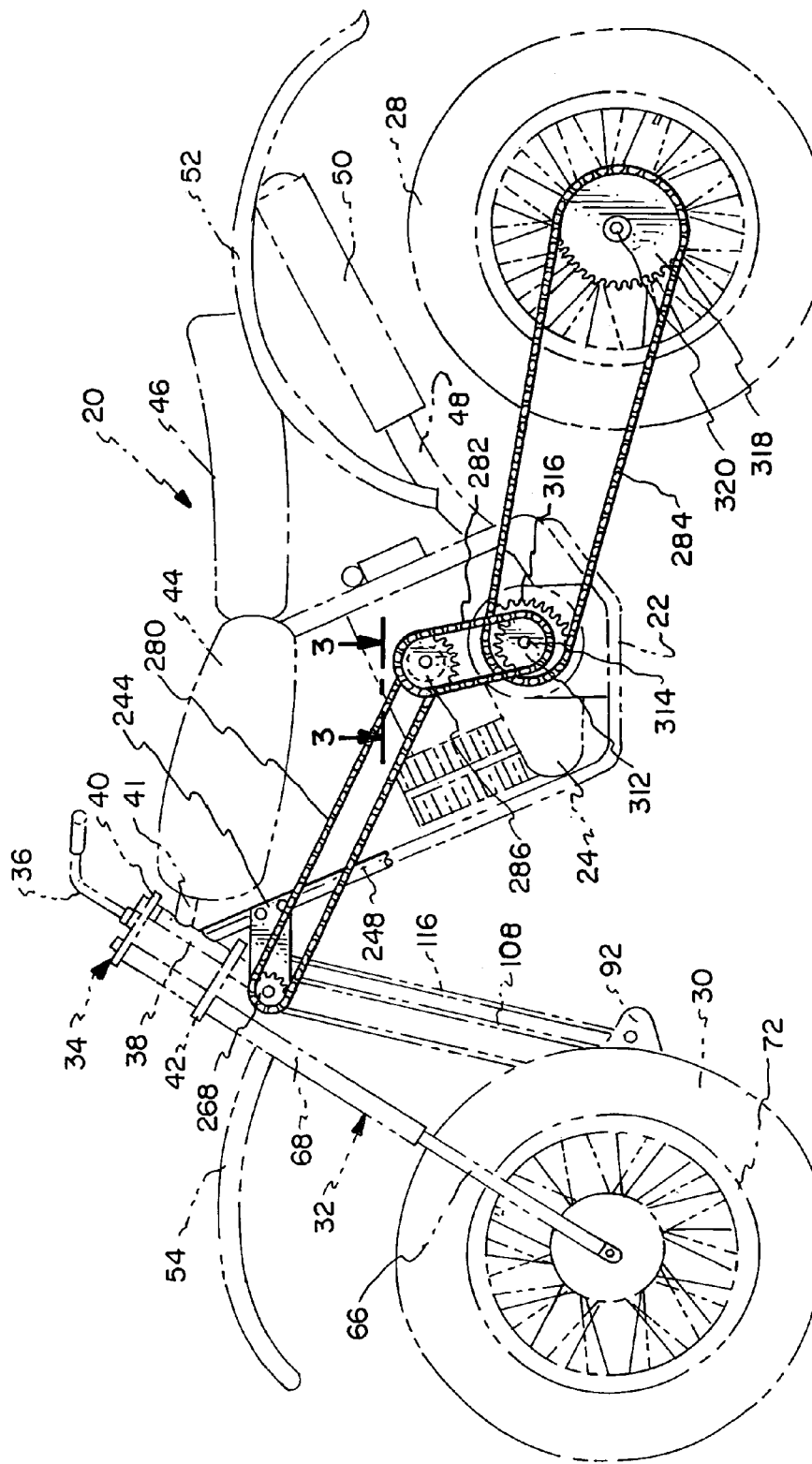
FIG. 2 is a left side elevational view showing the chain arrangement of the motorcycle that is used to operate both the front wheel drive and rear wheel drive of the motorcycle with the motorcycle again being shown in phantom.

Referring particularly to FIGS. 1 and 2 of the drawings, there is depicted in phantom lines a conventional motorcycle 20 which has a frame 22 on which is mounted a motor 24. On the rear portion of the frame 22 there is mounted a rear wheel yoke 26 on which is mounted the rear wheel 28. The plane of rotation of the rear wheel 28 is to be in alignment with the plane of the rotation of the front wheel 30. The front wheel 30 is supported by a bifurcated fork assembly 32 relative to a steering assembly 34. The steering assembly 34 is manually operated through a handlebar 36 which is mounted in conjunction with an elongated member known as a frame head 38. Mounted on the frame head 38 are a pair of parallel spaced apart plates known as an upper steering plate 40 and a lower steering plate 42. Frame head 38 is secured to bottom surface of steering plate 40 by using lock nuts 51 and 53 which connect with threaded section 55 of a steering stem 33. Threaded section 55 passes through hole 57 formed in steering plate 40. Steering stem 33 is secured to top surface of steering plate 42. Steering stem is telescopingly rotationally mounted within head 38. Handlebar 36 is securely mounted on saddle brackets 59 and 61 which are secured to the top surface of steering plate 40.

The motorcycle 20 includes a fuel tank 44 which is located just forward of the operator's seat 46 and is mounted on top tube 41 of frame 22. The motor 24 expels exhaust gases through exhaust pipe 48 and then through muffler 50. Covering the rear wheel 28 will be a rear fender 52 and covering the front wheel 30 is a front fender 54.

Figure 21:
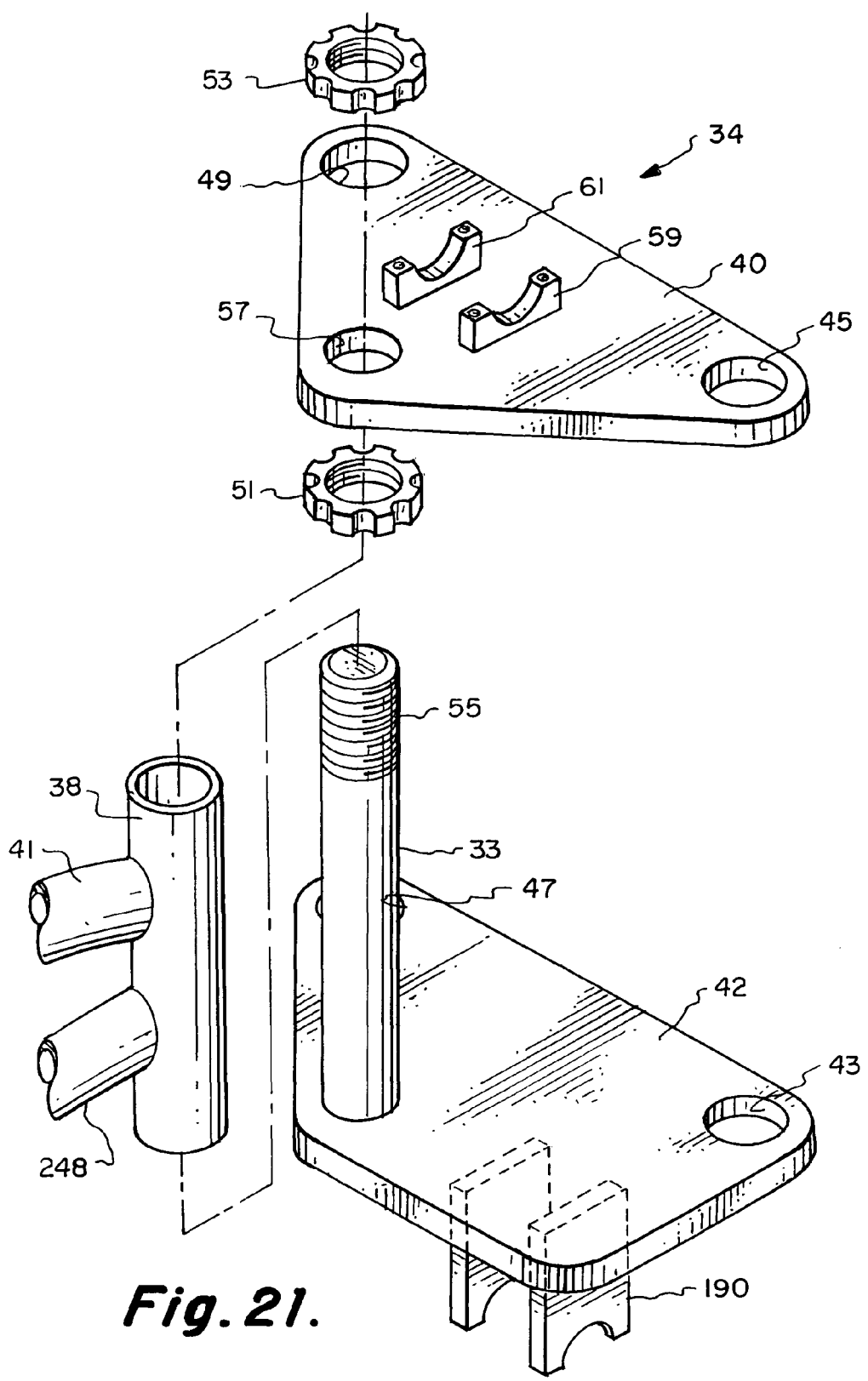
FIG. 21 is an exploded isometric view of the steering assembly used in this invention.
Figure 22:
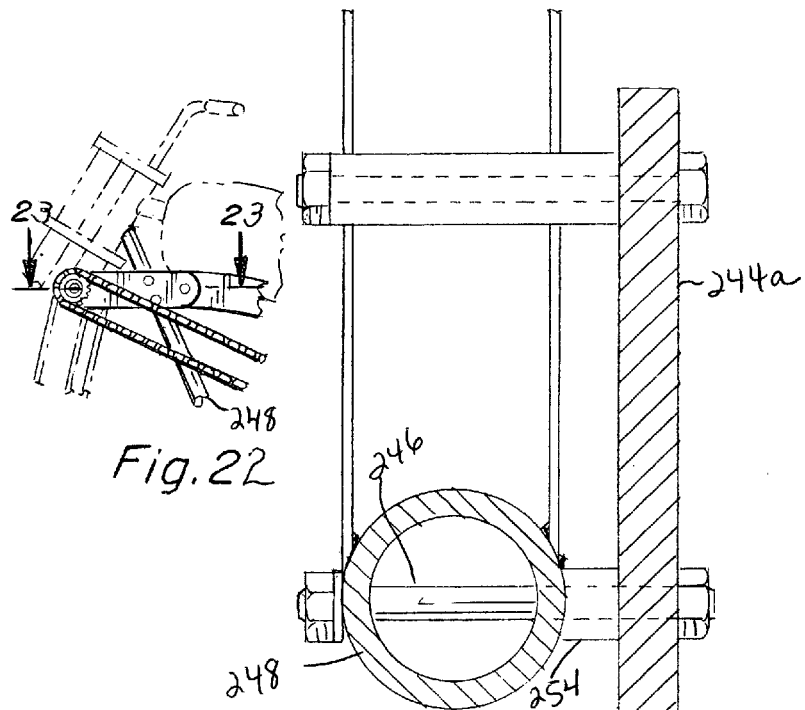
FIG. 22 is a side view of the invention showing the C-V joint in relation to the steering mechanism.

The fork assembly 32 is composed of a right yoke unit that is formed of an upper tube 56 and a lower tube 58. The tube 58 is telescopingly mounted within the upper tube 56. Included within the upper tube 56 is a shock absorber and spring assembly, which is not shown. The lower tube 58 is fixedly mounted by nut 60 onto an axle 62 (see FIG. 18). The opposite end of the axle 62 is fixedly mounted by nut 64 to a lower tube 66. The lower tube 66 is mounted within upper tube 68. Tubes 56 and 68 are fixedly mounted to the lower steering plate 42 and upper steering plate 40, as is clearly shown in FIGS. 13 and 21. With tube 56 tightly secured in hole 43 of steering plate 42 and within hole 45 of steering plate 40 with tube 68 tightly secured in hole 47 of steering plate 42 and within hole 49 of steering plate 40.

Figure 18:
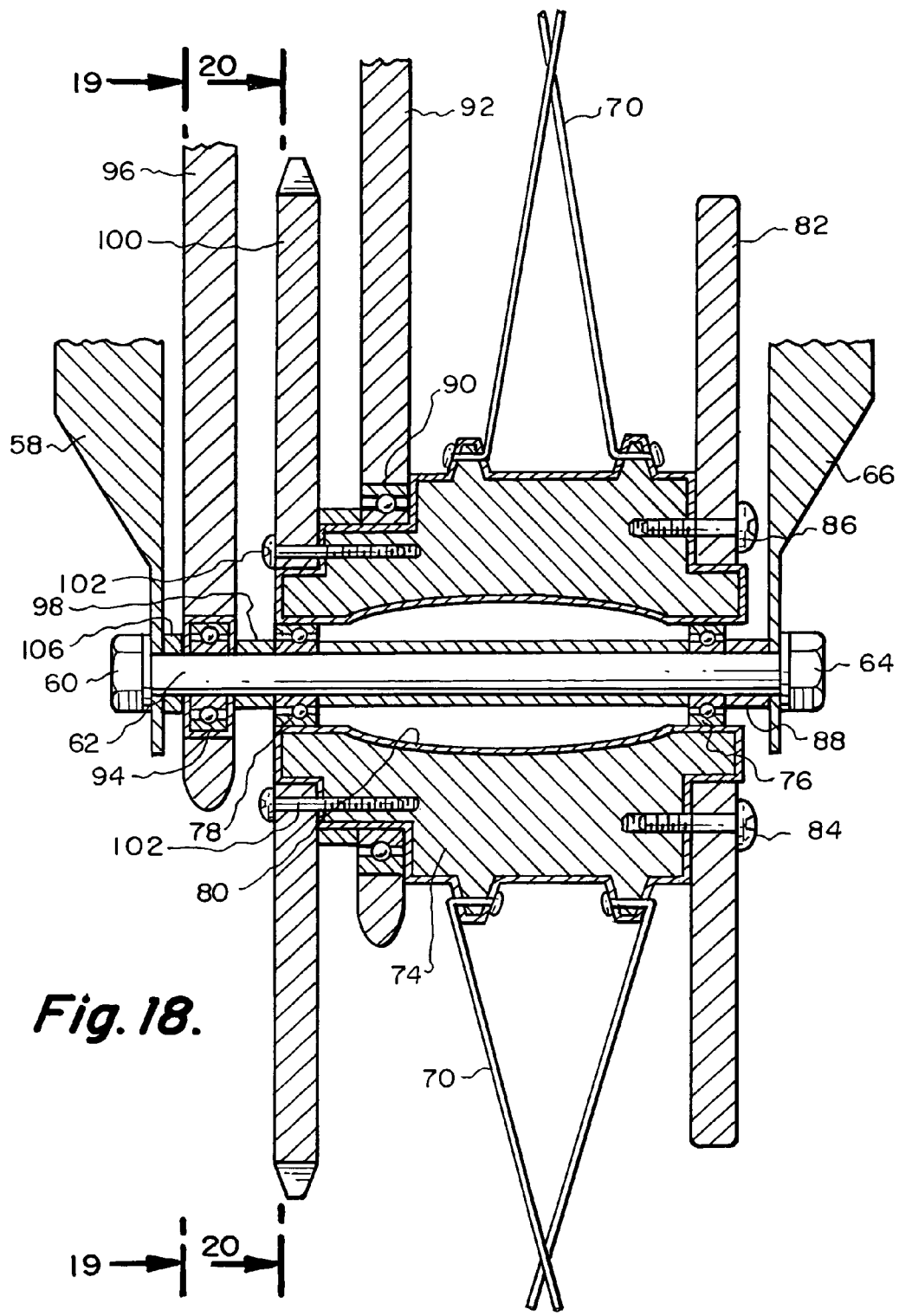
FIG. 18 is a cross-sectional view taken through the front wheel hub of the motorcycle of the present invention taken along line 18-18 of FIG. 1.
Figure 19:
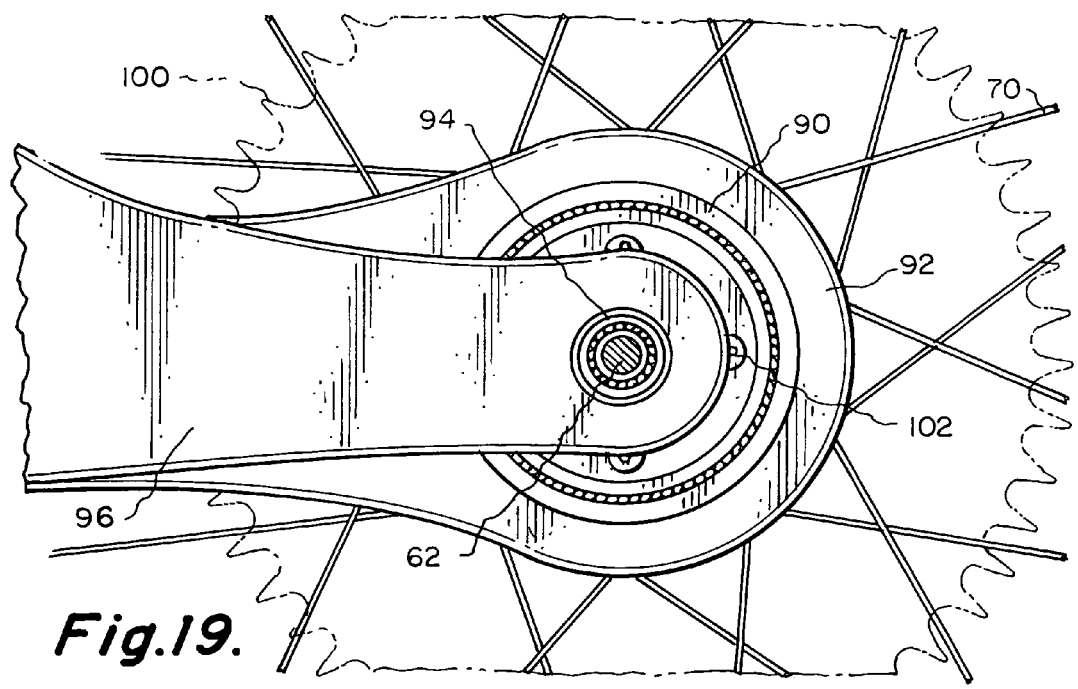
FIG. 19 is a side view, partly in cross-section, of side plate 96.
Figure 20:
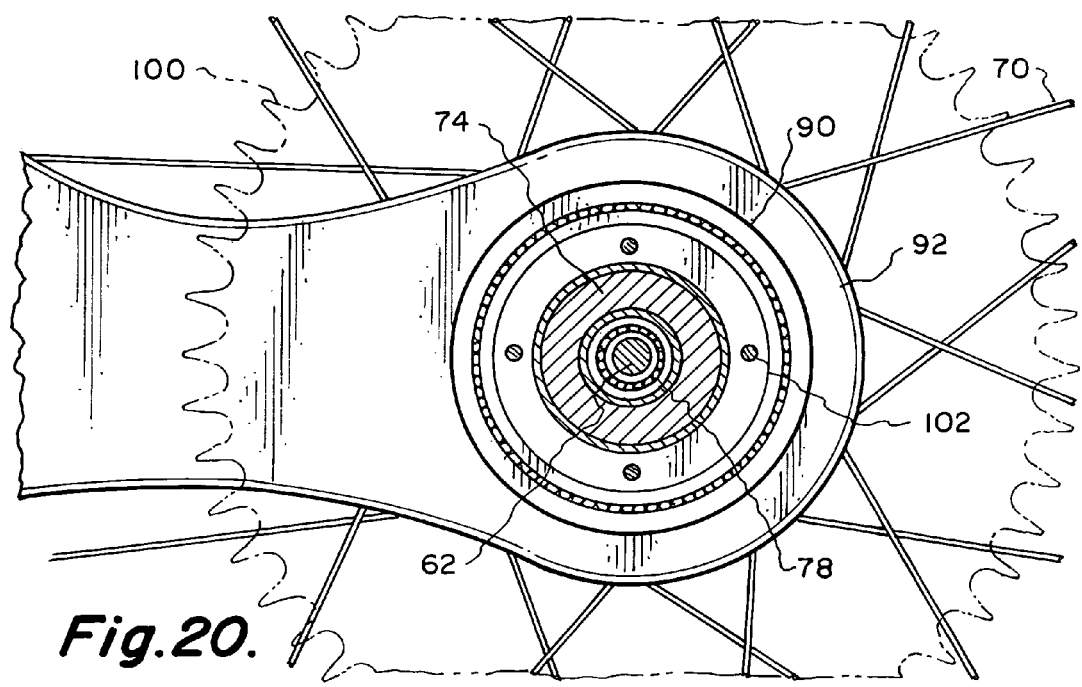
FIG. 20 is a side view, partly in cross-section, of sprocket 100.

Referring specifically to FIG. 18, there is shown wire spokes 70 which are used to connect to the tire rim 72 of the front hub 30. The wire spokes 70 mount the front wheel 30 onto the hub 74. The hub 74 is rotationally mounted by bearings 76 and 78 on the axle 62. The axle 62 is essentially fixed to the frame 22 by means of the yoke assembly 32. The hub 74 includes a through opening 80 within which is mounted the bearings 76 and 78. Mounted on one side of the hub 82 is a disc brake rotor 82 that forms no specific part of this invention. The disc brake rotor 82 is fixedly mounted to the hub 74 by means of bolts 84 and 86. A spacer 88 is mounted on the axle 62 located between the hub 74 and the lower tube 66 and the nut 64. The function of the spacer 88 is to have the lower tube 66 to be spaced from and not interfere with the operation of the disc brake rotor 82.

Low frictionally mounted by bearing 90 on the hub 74 is a side plate 92. Rotationally mounted by bearing 94 on the axle 62 is a side plate 96. Spacer 98 is located about the axle 62 and is to function to keep the side plate 96 spaced from a sprocket 100. The sprocket 100 is fixedly mounted by bolts 102 and 104 to the hub 74. The lower tube 58 is spaced from side plate 96 by spacer 106 which is mounted on the axle 62.

Mounted on the sprocket 100 in an engaging manner is a chain 108.

The chain 108 is conducted over a pair of idler sprockets 110 and 112. The upper end of the chain 108 also is conducted over a drive sprocket 114. Idler sprockets 110 and 112 are mounted between side plates 92 and 96 and are free to rotate relative thereto. A torque rod 116 is mounted between lower steering plate 42 and block 118 which is fixedly mounted on the opposite ends thereof to the side plates 92 and 96. It is to be noted that in looking at FIG. 14 that the torque rod 116 is in alignment with the plane of operation of the chain 108. This is important in order to avoid a sideways pulling action on the front chain 108 of the motorcycle 20, that is having a tendency to pull to the left or pull to the right. The torque that will be transmitted to the front wheel 30 will be transmitted in a balanced manner with no pull being created. When the motorcycle 20 is moving along and goes over bumps, the front wheel 30 will move up and down with the shock being absorbed by the shock absorber within the fork assembly 32. This movement up and down of the front wheel will have a tendency to shorten and lengthen the chain 108, although the shortening and lengthening of the chain 108 will be held to a minimum because of the use of the idler sprockets 110 and 112 and positioning the idler sprockets 110 and 112 in an almost right angled position from the sprocket 100. However, in order to compensate for the minor amount of shortening and lengthening of the chain 108, there is included a chain tightener 120 which is mounted by bolts 122 to the side plates 92 and 96. Reference is to be had to FIGS. 15 and 16 that clearly show the chain tightener 120 of this invention. Idler sprocket 110 is low frictionally mounted for free rotation by bearing 124 on pin 126 which is also mounted between the side plates 92 and 96. The pin 126 is mounted within an arcuate elongated slot 128 formed within the side plate 96 and also within a similar aligned arcuate elongated slot 130 formed within the side plate 92. Pin 126 is fixedly mounted to legs 132 and 134 of a yoke which includes an apex section 136 that connects between the legs 132 and 134. The leg 132 includes a right angled extension 138 with leg 134 including a similar such extension 140. The extension 138 is pivotally mounted by bolt fastener 142 to the side plate 96. The extension 140 is pivotally mounted by bolt 144 to the side plate 92.

The apex section 136 includes a centrally located protuberance 146. A coil spring 148 is to be mounted about the protuberance 146 with the protuberance 146 functioning to keep one end of the coil spring 148 in continuous aligned contact with the apex section 136. The opposite end of the coil spring 148 is mounted within a cap 150. Cap 150 has fixedly mounted on its exterior surface a threaded member 152. Threaded member 152 passes through hole 154 formed within a mounting yoke 156. The threaded member 152 passes through a nut 158 to which it is threadably connected and terminates in a bolt head 160.

Initially, the nut 158 is to be loosened with the bolt head 160 turned in order to apply the correct amount of compression within the coil spring 148. This correct amount of compression will in turn result in the production and the desired amount of tension in the spring 108. This is caused by the idler sprocket 110 moving within the arcuate elongated slots 128 and 130. The mounting yoke 156 is fixed to both the plates 92 and 96 by the bolts 122. It is to be understood that the chain tightener 120 can be adjusted by loosening of the bolt head 160 which will vary the amount of compression within the coil spring 148 and hence alter the position of the idler sprocket 110 relative to the arcuate elongated slots 128 and 130 thereby increasing or decreasing the tension in the chain 108.

The idler sprocket 112 is fixedly mounted between the side plates 92 and 96 by a pin 162. Surrounding the pin 162 is a sleeve 164 on which is mounted a bearing 166 which is deemed to be part of the idler sprocket 110. Surrounding the pin 162 is a sleeve 168 on which is mounted a bearing 170 which is deemed to part of the idler sprocket 112. The outer end of the torque rod 116 is mounted within block 118. Passing through the block 118 is a fastening bolt 174. It is to be understood that each of the sleeves 164, 168 and 172 abut against the side plates 92 and 96. The upper end of the torque rod 116 is mounted on a connector 176 which is fixedly mounted onto the lower steering plate 42.

The torque rod 116 is threaded and adjustable in length so idler sprocket 110 can be positioned in the lower portion of slots 128 and 130. This compensates for chain wear or for sprockets with larger or smaller numbers of teeth.

Sprocket 114 includes a central splined hole 178. Splined hole 178 is mounted to splined area 180 on a sleeve 182.

Sleeve 182 includes a through splined hole 184. Spline shaft 186 is to be engaged with splined hole 184. Spline shaft 186 has a rounded outer end 187 and a necked-in area 189 which is spaced slightly from rounded outer end 187. As the motorcycle 20 is steering and encounters bumps, the steering can adjust by permitting turning of sleeve 182 on rounded outer end 187. The inner edge 185 of sleeve 182 is provided clearance for this deflecting movement by the necked-in area 189 which provides space for the edge 185 to enter. Mounted on the outer end of the sleeve 180 is a bearing 188. Mounted about the bearing 188 are a pair of plates 190 and 192. The plates 190 and 182 are connected together by a pair of elongated bolts 194 and 196. These bolts 194 and 196 are fixedly mounted onto the lower steering plate 42. Bearing 188 is prevented from axial movement on sleeve 182 by means of a snap ring 198. Sprocket 114 is actually located on sleeve 182 by means of snap rings 200 and 202.

Also mounted on sleeve 182 is a bearing 204. Bearing 204 is restrained in position on sleeve 182 by means of a snap ring 206. Bearing 204 is mounted within an opening formed within a pair of mounting plates 208 and 210. Plates 208 and 210 are connected by means of a pair of elongated bolts 212 and 214. Bolts 212 and 214 are fixedly secured to lower steering plate 42.

Figure 6:
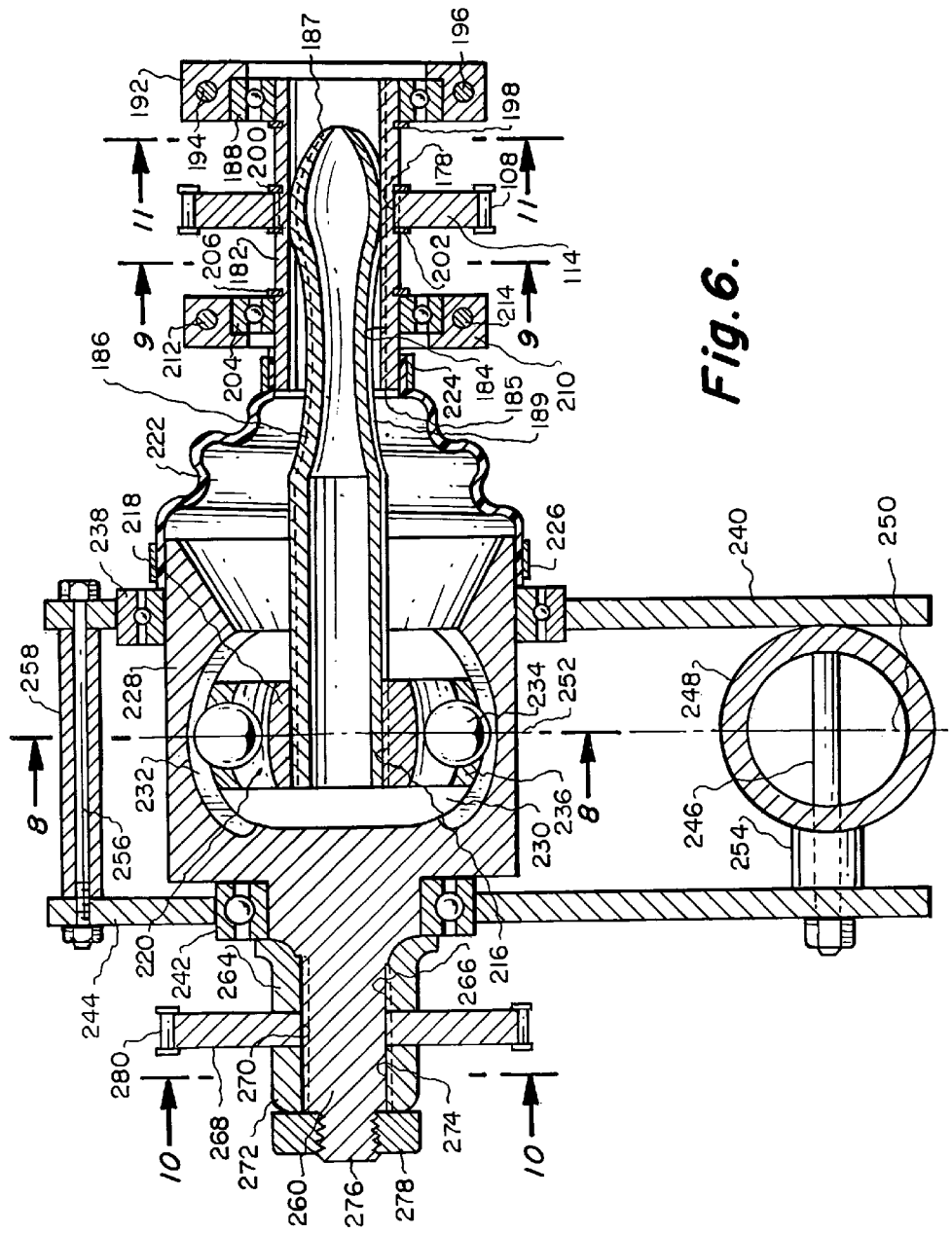
FIG. 6 is a cross-sectional view through the power transmitting joint of the present invention taken along line 6-6 of FIG. 1 showing the output shaft of the power transmitting joint located in a direction which will steer the motorcycle in a straight direction.
Figure 12B:
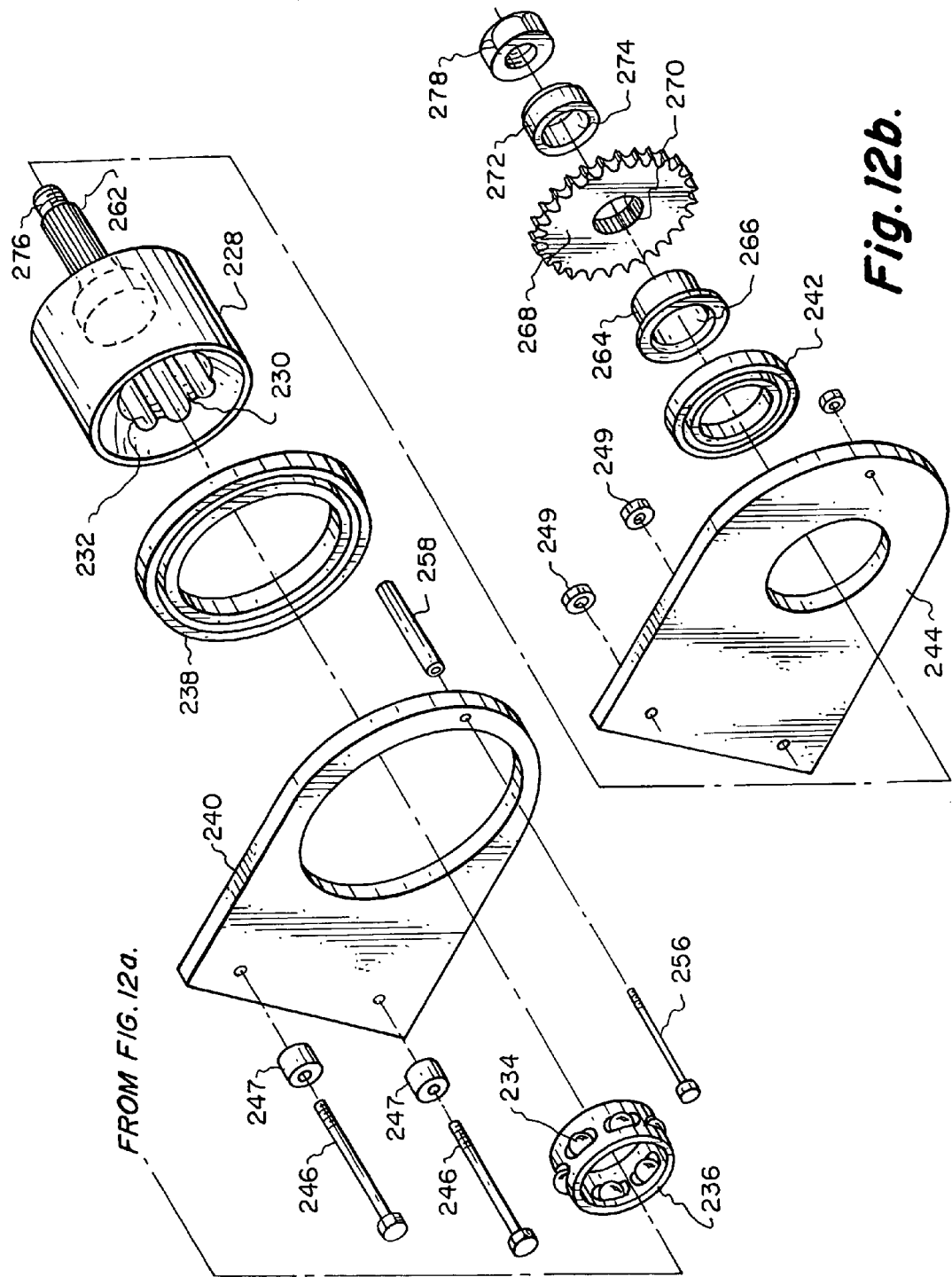
FIG. 12B is an exploded isometric view of the housing of the power transmitting joint and the output shaft of the power transmitting joint.

The inner end of the spline shaft 186 is engaged with spline hole 216 of a drivestar 218. Drivestar 218 has, about its circumference, six in number of longitudinal grooves 220. A dirt protective flexible shroud 222 is mounted by clamp rings 224 and 226 respectively on sleeve 182 and a joint housing 228. Joint housing 228 has an internal chamber 230. Internal chamber 230 has a wall surface and formed within the wall surface are six in number of evenly spaced apart arcuate grooves 232. Mounted within each groove 220 is a ball 234. The balls 234 move within the grooves 220 as the motorcycle 20 is steered. The amount of deflection of the balls 234 is one-half of the steering deflection. For example, if the steered angle is thirty degrees off center (either right or left), the deflection of ball axis 199 will be fifteen degrees (see FIG. 7). The balls 234 are retained by a retaining ring 236. There is to be a single ball 234 within a single groove 232. Each ball 234 assumes a loose fit within groove 220 to provide for free low frictional rotation of shaft 186 (see FIG. 8). When steering of the motorcycle 20, the steering plates 40 and 42 move horizontally to the right and to the left. During this movement, the spline shaft 186 and the structure that is mounted thereon is pivoted, as shown in FIGS. 6 and 7, with the leftward most position being shown in dotted lines in FIG. 7 and the rightmost position being shown in dotted lines in FIG. 7. During this movement, the balls 234 ride within their respective groove 232. During this movement, a driving connection is still maintained between the spline shaft 186 and the joint housing 228.

Figure 23:
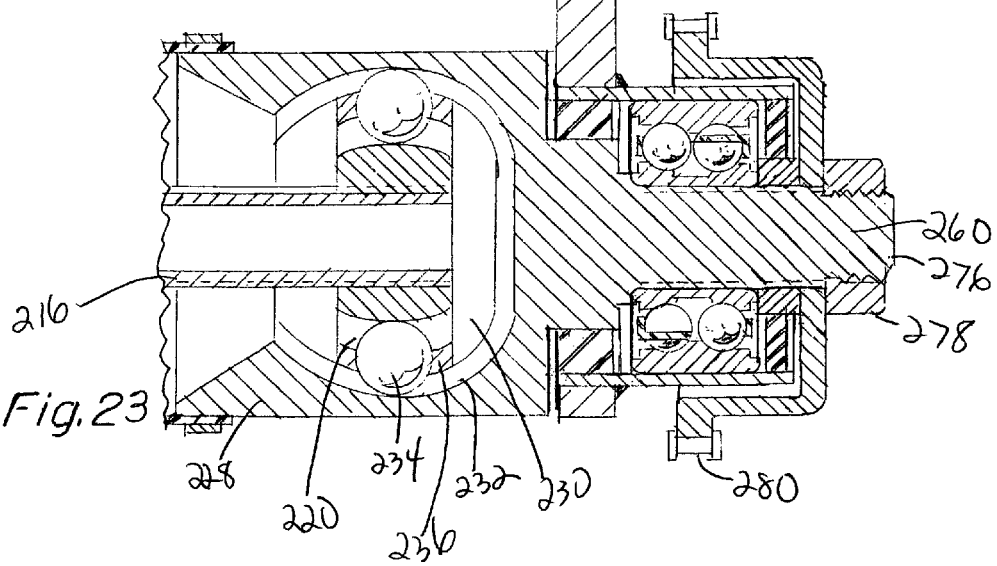
FIG. 23 is taken along line 23-23 of FIG. 22.

Joint housing 228 is mounted by ball bearing assembly 238 to the first support plate 240. Joint housing 228 is also mounted by means of a ball bearing assembly 242 to a second support plate 244. Support plates 230 and 244 are fixedly mounted by bolt fasteners 246 to downtube 248 of the frame 22 of the motorcycle 20. Each bolt fastener 246 passes through a spacer 247 and is each secured by a nut 249 mounted on the back side of support plate 244. It is desirable that the frame plane 250 be in alignment with the transverse axis 252 which passes through the joint housing 228 and the center of the balls 234. This alignment is clearly shown in FIG. 6. This alignment only occurs when the spline shaft 186 is in its centered position, which is shown in FIG. 6. This alignment will balance the steering forces when steering of the motorcycle 20 so that when the spline shaft 186 is moved to the different position shown in FIG. 7, there will not be a tendency for an unbalanced force trying to turn the motorcycle 20 either to the left of to the right. To ensure that the frame plane 250 is precisely aligned with the transverse axis 252, there is a spacer 254 mounted about each of the bolts 246 with it being understood that there is a separate spacer 254 for each bolt 246. As a result, the downtube 248 is located against each of the spacers 254 and also abuts against first support plate 240. The outer end of the support plates 240 and 244 are connected together by bolts 256 with there being an elongated spacer 258 located between plates 240 and 244. FIG. 23 shows a variation of the assembly illustrated in FIG. 6. In this configuration, a thicker single support plate 244a is used rather than two single shafts 244 and 240 as shown in FIG. 6.

Joint housing 228 is integrally attached to a short spline shaft 260. Exteriorly mounted on the short spline shaft 260 are an annular series of splines 262. A spacing washer 264 has a centrally located through opening 266. This spacing washer 264 is located between sprocket 268 and bearing assembly 242. Sprocket 268 has a central through hole which includes a series of splines 270. Splines 270 are in engagement with splines 262 of the short spline shaft 260. Mounted on splines 262 is an outside spacing washer 272 which includes a through hole 274. The reason that washer 264 and 272 are splineingly connected to the splines 262 along with sprocket wheel 268 is so that all three parts will be pivoted when the short spline shaft 260 is pivoted. This particular arrangement provides for the lowest friction possible during the rotation. The outer end of the short spline shaft 260 includes a threaded knob 276. A nut 278 is threadably connected to knob 276. Nut 278 will also pivot along with short spline shaft 260. The purpose of nut 278 is to secure and fix in position washers 264 and 272 and sprocket 268 on the spline shaft 260.

Operatively connecting with sprocket 268 is a chain 280. The chain 280 also connects with a sprocket 286. This sprocket 286 is mounted on a shaft 288. This mounting on the shaft 288 is accomplished by a key 290. Set screws 289 and 291, which are mounted in sprocket 286, abuts tightly against key 290. The shaft 288 is mounted to the frame 22 of the motorcycle with the shaft 288 being low frictionally rotationally supported by means of bearings 292 and 294. Secured by key 293 located in shaft 288 is a sleeve 295. Rotatably mounted between the bearings 292 and 294 on the sleeve 295 in between the bearings 292 and 294 is a second set of bearings 296 and 298. The bearings 296 and 298 are used to mount discs 300 and 302 in a low frictional rotational manner relative to the shaft 288. In between the discs 300 and 302 is mounted a sleeve 304. The sleeve 304 is secured to the discs 300 and 302 respectively by bolts 306 and 308. Fixedly mounted on the exterior surface of the sleeve 304 is a sprocket 310. Short chain 282 connects between sprocket 286 and a motor sprocket 312. Sprocket 286 includes an enlarged center section 311 which is fixed by key 313 to shaft 288. The motor sprocket 312 is to be fixedly connected onto the output shaft 314 of the motor 24. Also mounted on the output shaft of the motor there is another sprocket 316, which is not observable in FIGS. 3 and 4 because it is basically hidden by chain 282 and sprocket 310. Sprocket 316 is used to drive chain 284 which connects to the rear wheel sprocket 318. The rear wheel sprocket 318 is fixedly mounted onto rear wheel axle 320 of the rear wheel 28.

Thus, it can be seen that the output of the motor 24 is used to drive the rear wheel 28 through chain 284. Also, that same output is transferred through chains 282 and 280 and chain 108 to rotate the front wheel 30.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. It should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. In combination with a motorcycle which has a front wheel and a rear wheel mounted on a frame, said frame including an upper steering plate and a lower steering plate, a steering stem which has a longitudinal center axis known as the steering axis, a handlebar assembly is mounted on said upper steering plate and stem assembly with pivoting occurring about said longitudinal center axis, said handlebar assembly for turning of said front wheel within a horizontal steering angle which will steer said motorcycle to a leftward direction and to a rightward direction, a fork assembly connected to both said upper steering plate and said lower steering plate and stem assembly and said front wheel, the improvement comprising:

a constant velocity joint mounted on said frame, said constant velocity joint to receive power from a motorcycle motor, said constant velocity joint having an output shaft having a center axis, said output shaft being connected to said lower steering plate and stem assembly, a joint housing having an internal chamber, said joint housing connected to a first end of said output shaft, a series of balls arranged in a circle that transmits power from the outside to an inside drive star which is connected by splines to said output shaft located within said internal chamber and drivingly connected to said joint housing, said balls connecting with said output shaft, said joint housing to be rotated by power from said motor, said constant velocity joint being mounted directly below said steering stem, said constant velocity joint containing said series of balls running in a circular plane, said plane being centered on said steering axis both horizontally and longitudinally whereby not only will power be transmitted from said motor to said rear wheel but also said front wheel;

a continuous chain connected between said front wheel and a sprocket engaged upon a splined exterior surface of a sleeve, said sleeve having a splined axial passage engaged upon a cooperatively splined exterior of a second end of said output shaft extending from said constant velocity joint to cause driving rotation of said front wheel;

a circumferential relief formed in said second end of said output shaft between said sprocket and said constant velocity joint, said relief providing clearance for a deflection of said center axis of said output shaft with said axial passage, said deflection providing means to prevent interference with steering of said motorcycle when traversing bumps; and an inner side plate and an outer side plate with said chain running therebetween wherein said inner side plate runs on a hub and said outer side plate runs on an axle.

2. The combination as defined in claim 1 wherein:

said frame defining a frame plane, said balls to be in alignment with said frame plane, said steering axis being on the same plane as said frame plane.

3. The combination as defined in claim 2 wherein:

when a longitudinal center axis of said output shaft is located perpendicular to said frame plane a driving axis through said balls lies within said frame plane.

4. The combination as defined in claim 1 wherein:

a torque rod mounted between said lower steering plate assembly and said front wheel mounted to a point between said inner side plate and said outer side plate, said torque rod and a spring tensioner to maintain said continuous chain in its correct position regardless of suspension movement or power applied, said torque rod being located parallel to and in longitudinal alignment with said chain.

5. The combination as defined in claim 4 wherein:

said chain and said torque rod lying within a steering plane, when said front wheel is positioned to cause said motorcycle to move in a directly forward direction said steering plane in line with said frame plane.

6. The combination in claim 1 wherein:

said internal chamber having a substantially circular transverse cross-section defined by a wall surface, said internal chamber having a series of spaced apart grooves formed in said wall surface, said grooves being parallel and arcuate perpendicularly to the direction of travel of said motorcycle longitudinally, a ball of said balls to be located within each said groove with there being a separate said ball for each said groove, whereby said output shaft being movable horizontally for steering and power is continuously transmitted through said constant velocity joint regardless of the position of said steering assembly.

7. The combination as defined in claim 1 wherein:

said output shaft has a rounded outer end and a necked-in area which is spaced slightly from said rounded outer end.

* * * * *